United States Patent
Wang

(10) Patent No.: US 9,405,149 B2
(45) Date of Patent: Aug. 2, 2016

(54) DIRECT BACKLIGHT MODULE

(71) Applicant: Shenzhen China Star Optoelectronics Technology Co., LTD., Shenzhen, Guangdong Province (CN)

(72) Inventor: Yewen Wang, Shenzhen (CN)

(73) Assignee: SHENZHEN CHINA STAR OPTOELECTRONICS TECHNOLOGY CO., LTD., Shenzhen, Guangdong Province (CN)

(*) Notice: Subject to any disclaimer, the term of this patent is extended or adjusted under 35 U.S.C. 154(b) by 573 days.

(21) Appl. No.: 13/807,295

(22) PCT Filed: Dec. 4, 2012

(86) PCT No.: PCT/CN2012/085774
§ 371 (c)(1),
(2) Date: Dec. 27, 2012

(87) PCT Pub. No.: WO2014/040344
PCT Pub. Date: Mar. 20, 2014

(65) Prior Publication Data
US 2015/0205165 A1      Jul. 23, 2015

(30) Foreign Application Priority Data

Sep. 14, 2012   (CN) .......................... 2012 1 0341641

(51) Int. Cl.
*G09F 13/04*      (2006.01)
*F21V 7/04*      (2006.01)
(Continued)

(52) U.S. Cl.
CPC ........ *G02F 1/133608* (2013.01); *G02B 6/0078* (2013.01); *G02F 1/133524* (2013.01);
(Continued)

(58) Field of Classification Search
CPC .................. G02F 1/133603; G02F 1/133608; G02F 2001/133314; G02F 1/133602; G02F 1/1333; G02F 1/133615; F21V 21/00; G02B 6/00; G02B 6/0011; G02B 6/0046; G02B 6/0051; G02B 6/0078; G02B 6/0053; G02B 6/0055; F21S 2/005; G06F 1/1601; H05K 5/0217; H05K 7/18
USPC ........... 359/48, 385, 475, 591, 798; 362/97.1; 349/56, 58, 62, 64
See application file for complete search history.

(56) References Cited

U.S. PATENT DOCUMENTS

2004/0183962 A1    9/2004   Hua-Nan
2010/0188601 A1*   7/2010   Onishi ................. G02B 6/0088
                                                                349/61
(Continued)

FOREIGN PATENT DOCUMENTS

CN    101276082 A    10/2008
CN    101324725 A    12/2008
(Continued)

*Primary Examiner* — Jason Moon Han
*Assistant Examiner* — Omar Rojas Cadima
(74) *Attorney, Agent, or Firm* — Cheng-Ju Chiang

(57) ABSTRACT

The present invention provides a direct backlight module, which includes a backplane, a plurality of LED light bars retained on the backplane, a plurality of light guide plates arranged alternate with respect to the LED light bars, and a diffusion plate mounted on the backplane. The direct backlight module includes the light guide plates that are arranged between the LED light bars to improve utilization rate of light energy of the LED light bars so as to reduce the number of LED lights included in the LED light bars to thereby reduce the manufacturing cost. Further, the arrangement of the light guide plates effectively shortens the light mixing distance and enhances homogeneity of light illumination and also reduces the thickness of backlight module to thereby facilitate thinning of a liquid crystal display device.

7 Claims, 2 Drawing Sheets

(51) Int. Cl.
*G02F 1/1335* (2006.01)
*F21V 8/00* (2006.01)

(52) U.S. Cl.
CPC .... *G02F1/133606* (2013.01); *G02F 1/133609* (2013.01); *G02F 1/133611* (2013.01); *G02B 6/0025* (2013.01); *G02B 6/0088* (2013.01); *G02F 1/133603* (2013.01)

(56) References Cited

U.S. PATENT DOCUMENTS

2011/0235308 A1* 9/2011 Kang et al. .................... 362/97.2
2011/0242794 A1* 10/2011 Nakamura et al. ........... 362/97.1
2012/0147592 A1* 6/2012 Takase .......................... 362/97.1
2012/0182761 A1* 7/2012 Ikuta ................. G02F 1/133615
362/606

FOREIGN PATENT DOCUMENTS

| | | |
|---|---|---|
| CN | 201348177 Y | 11/2009 |
| CN | 101603657 A | 12/2009 |
| CN | 101799601 A | 8/2010 |
| CN | 101956940 A | 1/2011 |
| CN | 201866615 U | 6/2011 |
| CN | 102207264 A | 10/2011 |
| CN | 102354014 A | 2/2012 |
| JP | 2007-227286 A | 9/2007 |

* cited by examiner

US 9,405,149 B2

DIRECT BACKLIGHT MODULE

BACKGROUND OF THE INVENTION

1. Field of the Invention

The present invention relates to the field of liquid crystal displaying, and in particular to a direct backlight module.

2. The Related Arts

Liquid crystal display (LCD) has a variety of advantages, such as thin device body, low power consumption, and being free of radiation, and is thus widely used. Most of the LCDs that are currently available in the market are backlighting LCDs, which comprise a liquid crystal panel and a backlight module. The operation principle of the liquid crystal panel is that liquid crystal molecules are interposed between two parallel pieces of glass and a plurality of vertical and horizontal fine electrical wires is arranged between the two pieces of glass, whereby the liquid crystal molecules are controlled to change direction by application of electricity in order to refract out light emitting from the backlight module for generating images. Since the liquid crystal panel itself does not emit light, light must be provided by the backlight module in order to normally display images. Thus, the backlight module is one of the key components of an LCD. The backlight module can be classified in two types, namely side-edge backlight module and direct backlight module, according to the position where light gets incident. The side-edge backlight module comprises a backlighting source of an LED light bar arranged at an edge of a backplane that is located rearward of one side of the liquid crystal panel. The LED light bar emits light that enters a light guide plate (LGP) through a light incident face of the light guide plate and is projected out through a light emergence face of the light guide plate, after being reflected and diffused, to thereby pass through an optic film assembly to form a planar light source for the liquid crystal panel.

When compared to a liquid crystal display device incorporating a side-edge backlight module, a liquid crystal display device incorporating a direct backlight module shows advantages of high image quality (high contrast, localized light adjustment, scanning backlighting) and high energy saving. The backlight module of the liquid crystal display device evolves from the early side-edge backlight module to the direct backlight module. The conventional direct backlight module arranges a light source, such as CCFL (Cold Cathode Fluorescent Lamp) and LED (Light-Emitting Diode), at the rear side of a liquid crystal panel to form a planar light source directly supplied to the liquid crystal panel. Compared to LED, CCFL has shortcomings, such as high power consumption, high heat generation, and short lifespan and thus CCFL is gradually replaced by LED. However, a backlight module using LED as a light source has a thickness that is more than two times of that of a backlight module using CCFL as a light source, making it disadvantageous for thinning of liquid crystal display device.

SUMMARY OF THE INVENTION

An object of the present invention is to provide a direct backlight module, which has a simple structure low cost and is advantageous for thinning of liquid crystal display device.

To achieve the above object, the present invention provides a direct backlight module, which comprises a backplane, a plurality of LED light bars retained on the backplane, a plurality of light guide plates arranged alternate with respect to the LED light bars, and a diffusion plate mounted on the backplane.

The backplane comprises a bottom board and side boards connected to the bottom board.

The LED light bars and the light guide plates are alternately arranged on the bottom board.

Each of the light guide plates has two sides at which two positioning plates are respectively mounted to position and constrain the light guide plate on the bottom board.

The positioning plates each comprise a support section that has an end perpendicularly mounted to the bottom board and a retention section extending from the support section and parallel to the bottom board.

The positioning plates are made of a light-transmitting material.

The LED light bars each comprise a PCB and a plurality of LED lights mounted to and electrically connected to the PCB.

The diffusion plate is an integrally formed plate like structure.

The diffusion plate comprises a plurality of plate segments. The plurality of plate segments is alternately arranged with respect to the light guide plates and located above the light guide plates.

The plate segments are fixedly connected to ends of the support sections of the positioning plates that are distant from the bottom board.

The present invention also provides a direct backlight module, which comprises a backplane, a plurality of LED light bars retained on the backplane, a plurality of light guide plates arranged alternate with respect to the LED light bars, and a diffusion plate mounted on the backplane;

wherein the backplane comprises a bottom board and side boards connected to the bottom board;

wherein the LED light bars and the light guide plates are alternately arranged on the bottom board;

wherein each of the light guide plates has two sides at which two positioning plates are respectively mounted to position and constrain the light guide plate on the bottom board;

wherein the positioning plates each comprise a support section that has an end perpendicularly mounted to the bottom board and a retention section extending from the support section and parallel to the bottom board;

wherein the positioning plates are made of a light-transmitting material;

wherein the LED light bars each comprise a PCB and a plurality of LED lights mounted to and electrically connected to the PCB; and wherein the diffusion plate is an integrally formed plate like structure.

The efficacy of the present invention is that the present invention provides a direct backlight module, which comprises light guide plates arranged between LED light bars to improve utilization rate of light energy of the LED light bars so as to reduce the number of LED lights included in the LED light bars to thereby reduce the manufacturing cost. Further, the arrangement of the light guide plates effectively shortens the light mixing distance and enhances homogeneity of light illumination and also reduces the thickness of backlight module to thereby facilitate thinning of a liquid crystal display device.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, of the present invention will be apparent from the following detailed description of one or more embodiments of the present invention, with reference to the attached drawings. In the drawings.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
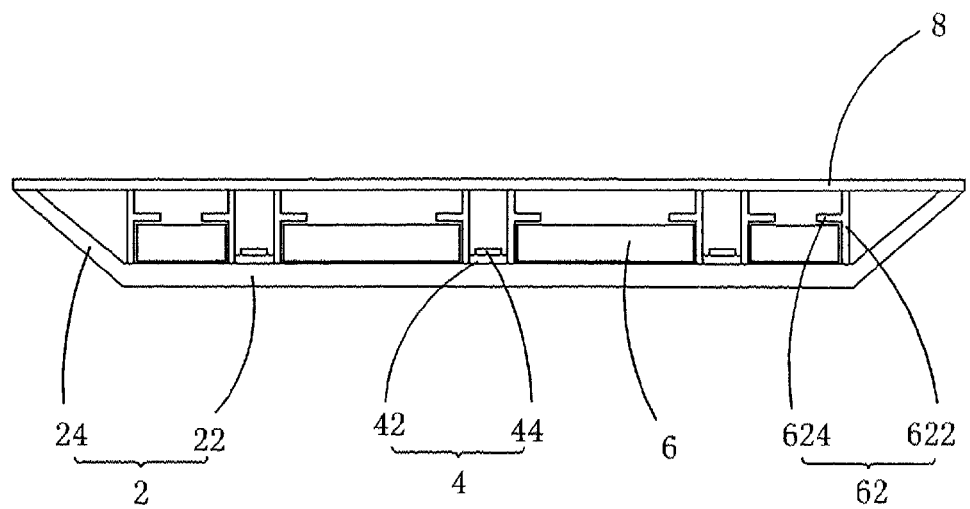
FIG. 1 is a schematic view showing a direct backlight module according to an embodiment of the present invention.
Figure 2:
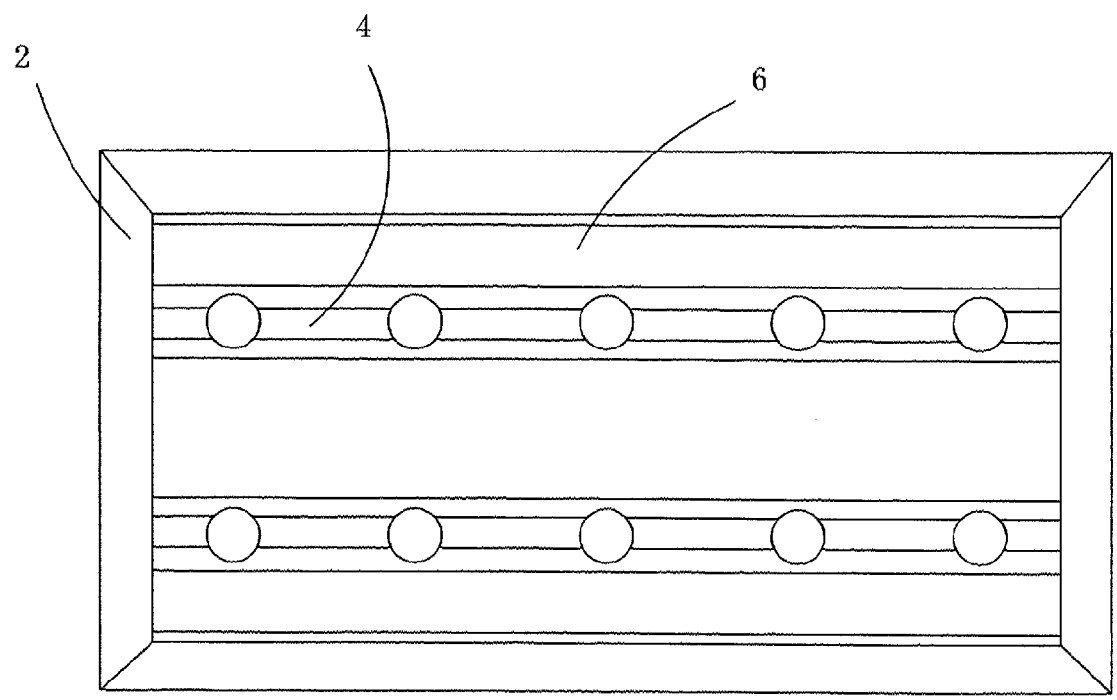
FIG. 2 is a schematic view showing an arrangement of LED light bars and light guide plates of the backlight module shown in FIG. 1.

Referring to FIGS. 1 and 2, the present invention provides a direct backlight module, which comprises a backplane 2, a plurality of LED light bars 4 mounted on the backplane 2, a plurality of light guide plates 6 alternately arranged with respect to the LED light bars 4, and a diffusion plate 8 mounted on the backplane. Due to the arrangement of the light guide plates 6, light mixing distance for the light emitting from the LED light bars 4 is extended so as to enhance the effect of light mixing and improve homogeneity of illumination and also improve utilization rate of the light emitting from the LED light bars and effectively lower down cost.

The backplane 2 comprises a bottom board 22 and side boards 24 connected to the bottom board 22.

The LED light bars 4 and the light guide plates 6 are alternately arranged on the bottom board 22.

Each of the light guide plates 6 has two sides at which two positioning plates 62 are respectively mounted to position and constrain the light guide plate 6 on the bottom board 22.

The positioning plates 62 each comprise a support section 622 that has an end perpendicularly mounted to the bottom board 22 and a retention section 624 extending from the support section 622 and parallel to the bottom board 22.

The positioning plates 62 are made of a light-transmitting material, preferably a high light transmittance material, so that light emitting from the LED light bars 4 can enter the light guide plates 6 more thereby to improve the utilization rate of the light of the LED light bars 4, reduce power consumption, and thus lower down cost.

The LED light bars 4 each comprise a printed circuit board (PCB) 42 and a plurality of LED lights 44 mounted to and electrically connected to the PCB 42. A portion of the light emitting from the LED lights 44 directly enters the diffusion plate 8, while a remaining portion transmit through the positioning plates 62 to then enter the light guide plates 6 to be subjected to refraction and reflection by the light guide plates 6 to travel into the diffusion plate, so as to improve the utilization rate of light energy. Compared to the conventional LED light bars, the number of LED lights used in the LED light bars 4 of the direct backlight module according to the present invention can be reduced so as to lower down the manufacturing cost.

In the instant embodiment, the diffusion plate 8 is an integrally formed plate like structure, which is supported on the side boards 24 of the backplane 2. Further, the end of the support section 622 of each of the positioning plates 62 that is distant from the bottom board 22 may also help supporting the diffusion plate 8 to improve the support to the diffusion plate 8.

In a condition where no optic film assembly is used, the direct backlight module of the present invention has a thickness that is more than 0.3 times of the pitch between two LED light bars, such as 0.5 times, so that the thickness of the direct backlight module can be greatly reduced, providing a condition for thinning a liquid crystal display device.

Figure 3:
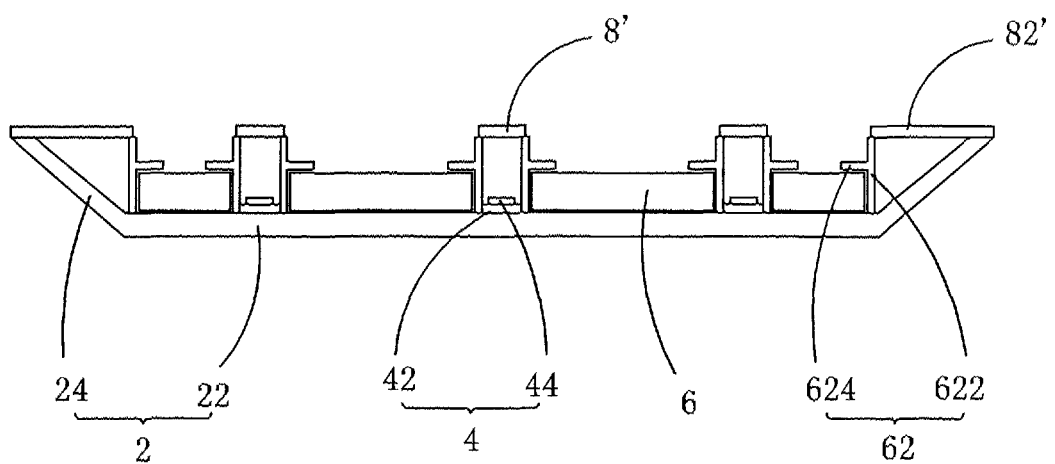
FIG. 3 is schematic view showing a direct backlight module according to another embodiment of the present invention.

Referring to FIG. 3, a schematic view is given to show a direct backlight module according to another embodiment of the present invention. In the instant embodiment, a diffusion plate 8' comprises a plurality of plate segments 82'. The plurality of plate segments 82' is alternately arranged with respect to the light guide plates 6 and is located above the light guide plates 6. Preferably, the number of the plate segments 82' is larger than that of the LED light bars 4 by two. The two segments that are located at opposite sides of the backplane 2 are each supported on the side boards 24 and the positioning plates 62, while the remaining segments are supported on two positioning plates 62. Preferably, the plate segments 82' are fixedly connected to the ends of the support sections 622 of the positioning plates 62 that are distant from the bottom board 22.

In summary, the present invention provides a direct backlight module, which comprises light guide plates arranged between LED light bars to improve utilization rate of light energy of the LED light bars so as to reduce the number of LED lights included in the LED light bars to thereby reduce the manufacturing cost. Further, the arrangement of the light guide plates effectively shortens the light mixing distance and enhances homogeneity of light illumination and also reduces the thickness of backlight module to thereby facilitate thinning of a liquid crystal display device.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A direct backlight module, comprising a backplane that comprises a bottom board and side boards connected to the bottom board, a plurality of light emitting diode (LED) light bars retained on the bottom board of the backplane, a plurality of light guide plates arranged alternate with respect to the LED light bars and set on the bottom board of the backplane, and a diffusion plate mounted on the backplane, wherein each of the light guide plates has two sides at which two positioning plates are respectively mounted, each of the positioning plates comprising a support section that has an end perpendicularly mounted to the bottom board and a retention section extending from a first side surface of the support section that faces the light guide plate and parallel to the bottom board so as to receive the side of the light guide plate therein and securely fix the light guide plate on the bottom board, and wherein two positioning plates are located on opposite sides of each of the LED light bars in such a way that each of the two positioning plates has a second side surface that is opposite to the first side surface and faces the LED light bar, the two second side surfaces of the two positioning plates being opposite to each other and spaced from each other to define therebetween a space for accommodating the LED light bar so that the positioning plates are each located between the LED light bar and one of the light guide plates; wherein at least a portion of the light from the light emitting diode (LED) light bars go directly to the diffusion plate.

2. The direct backlight module as claimed in claim 1, wherein the positioning plates are made of a light-transmitting material.

3. The direct backlight module as claimed in claim 1, wherein the LED light bars each comprise a printed circuit board (PCB) and a plurality of LED lights mounted to and electrically connected to the PCB.

4. The direct backlight module as claimed in claim 1, wherein the diffusion plate is an integrally formed plate structure.

5. The direct backlight module as claimed in claim 1, wherein the diffusion plate comprises a plurality of plate segments, the plurality of plate segments being alternately arranged with respect to the light guide plates and located above the light guide plates.

6. The direct backlight module as claimed in claim 5, wherein the plate segments are fixedly connected to ends of the support sections of the positioning plates that are distant from the bottom board.

7. A direct backlight module, comprising a backplane that comprises a bottom board and side boards connected to the bottom board, a plurality of light emitting diode (LED) light bars retained on the bottom board of the backplane, a plurality of light guide plates arranged alternate with respect to the LED light bars and set on the bottom board of the backplane, and a diffusion plate mounted on the backplane, wherein each of the light guide plates has two sides at which two positioning plates are respectively mounted, each of the positioning plates comprising a support section that has an end perpendicularly mounted to the bottom board and a retention section extending from a first side surface of the support section that faces the light guide plate and parallel to the bottom board so as to receive the side of the light guide plate therein and securely fix the light guide plate on the bottom board, and wherein two positioning plates are located on opposite sides of each of the LED light bars in such a way that each of the two positioning plates has a second side surface that is opposite to the first side surface and faces the LED light bar, the two second side surfaces of the two positioning plates being opposite to each other and spaced from each other to define therebetween a space for accommodating the LED light bar so that the positioning plates are each located between the LED light bar and one of the light guide plates; wherein at least a portion of the light from the light emitting diode (LED) light bars go directly to the diffusion plate;

wherein the positioning plates are made of a light-transmitting material;

wherein the LED light bars each comprise a printed circuit board (PCB) and a plurality of LED lights mounted to and electrically connected to the PCB; and wherein the diffusion plate is an integrally formed plate structure.

* * * * *